(12) United States Patent  (10) Patent No.: US 7,598,452 B1
Shotey et al.  (45) Date of Patent: Oct. 6, 2009

(54) IN-USE OUTLET COVER

(75) Inventors: Marcus J. Shotey, Scottsdale, AZ (US);
Michael J. Shotey, Las Vegas, NV (US);
Jeffrey P. Baldwin, Phoenix, AZ (US);
Kenneth C. Booth, Mesa, AZ (US)

(73) Assignee: TayMac Corporation, Gilbert, AZ (US)

( * ) Notice: Subject to any disclaimer, the term of this patent is extended or adjusted under 35 U.S.C. 154(b) by 0 days.

(21) Appl. No.: 11/610,058

(22) Filed: Dec. 13, 2006

Related U.S. Application Data

(63) Continuation-in-part of application No. 10/852,796, filed on May 24, 2004.

(60) Provisional application No. 60/750,276, filed on Dec. 13, 2005.

(51) Int. Cl.
*H02G 3/14* (2006.01)
(52) U.S. Cl. ............... 174/66; 174/67; 220/241; 220/242
(58) Field of Classification Search ........... 174/480, 174/50, 53, 57, 58, 66, 67, 481; 220/3.2–3.9, 220/4.02, 241, 242, 3.92; D8/353, 350; D13/177; 200/333; 439/536, 535
See application file for complete search history.

(56) References Cited

U.S. PATENT DOCUMENTS

| | | | |
|---|---|---|---|
| 1,952,719 A * | 3/1934 | Lewin | ............... 220/3.8 |
| 3,127,048 A | 3/1964 | Winter | |
| 3,437,738 A | 4/1969 | Wagner | |
| 4,803,307 A | 2/1989 | Shotey | |
| 5,280,135 A | 1/1994 | Berlin et al. | |
| 5,731,544 A | 3/1998 | Burck et al. | |
| 5,763,831 A | 6/1998 | Shotey et al. | |
| 6,127,630 A | 10/2000 | McKenzie et al. | |
| 6,133,531 A | 10/2000 | Hayduke et al. | |
| 6,441,307 B1 | 8/2002 | Shotey et al. | |
| 6,559,380 B2 * | 5/2003 | Soboleski | ............... 174/53 |
| 6,642,453 B2 | 11/2003 | Shotey et al. | |
| 6,722,621 B2 | 4/2004 | Johnson | |
| 2002/0104674 A1 | 8/2002 | Soboleski | |

OTHER PUBLICATIONS

Cooper Wiring Devices, "Cooper Wiring Devices Introduces New Line of While In Use Weather Protective Covers", web page, pp. 1-2, 2006.
Thomas & Betts, "Code Keeper—Universal While In-Use Covers",web page, pp. 1-2. 2003.

* cited by examiner

*Primary Examiner*—Angel R Estrada
(74) *Attorney, Agent, or Firm*—Booth Udall, PLC

(57) ABSTRACT

A while-in-use electrical device cover that includes elliptical and more than five-sided cover shapes is disclosed. Specific implementations feature a while-in-use electrical device cover that includes a base having an aperture configured to receive the face of an electrical device, a lid configured to close over the base through a hinge while an electrical connector is inserted into the electrical device, and a cord port extending through a surface of the cover. The base and lid are substantially elliptical. The base, lid, and hinge may be manufactured from plastics or other conventional material for a while-in-use electrical device cover using conventional fabrication methods.

12 Claims, 9 Drawing Sheets

IN-USE OUTLET COVER

CROSS REFERENCE TO RELATED APPLICATIONS

This document claims the benefit of the filing date of U.S. Provisional Patent Application 60/750,276 entitled "Multi-Sided In-Use Outlet Cover" to Shotey et al. which was filed on Dec. 13, 2005, the contents of which are hereby incorporated by reference herein.

The disclosure of U.S. patent application Ser. No. 10/852,796 entitled "Horizontal and Vertical Mountable Electrical Outlet Box with Living Hinge" to Shotey et al. which was filed on May 24, 2004, is hereby incorporated by reference herein.

BACKGROUND

1. Technical Field

Aspects of this document relate generally to covers for electrical devices.

2. Background Art

Covers are often used to protect electrical devices from exposure to rain, wind, and other contaminants. Conventional covers often have a lid attached to a base by a hinge. The base provides openings that correspond with a particular electrical device face. Relevant background information regarding covers for electrical devices is found in U.S. Pat. No. 5,763,831 to Shotey, et al. titled "Universal Cover Plate, Cover Plate Assembly, and Related Methods" the disclosure of which is hereby incorporated herein by reference.

SUMMARY

In one aspect, an implementation of a while-in-use electrical device cover includes a base having an aperture configured to receive the face of an electrical device, a lid configured to close over the base through a hinge while an electrical connector is inserted into the electrical device, and a cord port extending through a surface of the cover. The base and lid are substantially elliptical for a majority of their opening. The base, lid, and hinge may be manufactured from plastics or other conventional material for a while-in-use electrical device cover using conventional fabrication methods.

Specifically, a particular implementation of a while-in-use electrical device cover includes a lid and a base shaped substantially circular for a majority of its opening. The base further includes a ring with a lip inwardly extending from its circumference and an adapter, the adapter further including an aperture configured to accommodate the face of at least one electrical device. The adapter further includes at least one removable tab, where removal of the at least one removable tab enables the aperture to be converted to receive the face of at least one other electrical device.

In a second aspect, an implementation of a while-in-use electrical device cover includes a base having an aperture configured to receive the face of an electrical device, a lid configured to close over the base through a hinge while an electrical connector is inserted into the electrical device, and a cord port extending through a surface of the cover. The base has a top edge which has at least five sides and includes a base hinge member on a side of the top edge of the base. The lid is configured to close over the base under gravity force when the base is mounted over the electrical device when the electrical device is oriented horizontally and when it is oriented vertically.

Specifically, a particular implementation of a while-in-use electrical device cover includes an adapter having four sides and a base assembly mounted to an electrical box through the adapter.

In a third aspect, an implementation of a while-in-use electrical device cover includes a base comprising an aperture configured to receive the face of an electrical device, a lid configured to close over the base through a hinge while an electrical connector is inserted into the electrical device, and a cord port extending through a surface of the cover. The lid has at least five sides and includes a lid hinge member on a side of the lid. The lid is configured to close over the base under gravity force when the base is mounted over the electrical device when the electrical device is oriented horizontally and vertically.

Particular implementations of a while-in-use electrical device cover include an adapter having four sides and a base assembly mounted to an electrical box through the adapter.

Specifically, particular implementations of a while-in-use electrical device cover include a living hinge. In certain implementations, the base, lid, and hinge may be formed integrally as a single unit. In other implementations, the hinge may be a pin and barrel hinge.

Other particular implementations of a while-in-use electrical device cover include a base having at least one removable tab, where removal of the at least one removable tab enables the aperture to be converted to receive the face of at least one other electrical device. Other implementations have a base including an adapter configured to convert the aperture to receive the face of at least one other electrical device. In particular implementations, the adapter further includes at least one removable tab, where removal of the at least one removable tab enables the aperture to be converted to receive the face of at least one other electrical device.

In a fourth aspect, an implementation of a while-in-use electrical device cover features an installation method including the steps of placing a base comprising an adapter over an electrical device, coupling the base to an electrical box through the adapter, and coupling a lid to the base through a lid hinge member.

Specifically, particular implementations of a while-in-use electrical device cover installed according to the steps of the method include a base that is substantially circular and having a ring with a lip inwardly extending from its circumference.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended structure and/or assembly procedures for a while-in-use electrical device cover will become apparent for use with implementations of a while-in-use electrical device cover from this disclosure. Accordingly, for example, although particular bases, lids, hinges, and adapters is disclosed, such bases, hinges, lids, and adapters and implementing components may comprise any shape, size, style, type, model, version, measurement, concentration, material, quantity, and/or the like as is known in the art for such bases, lids, hinges, and adapters and implementing components, consistent with the intended operation of a while-in-use electrical device cover.

Figure 1:
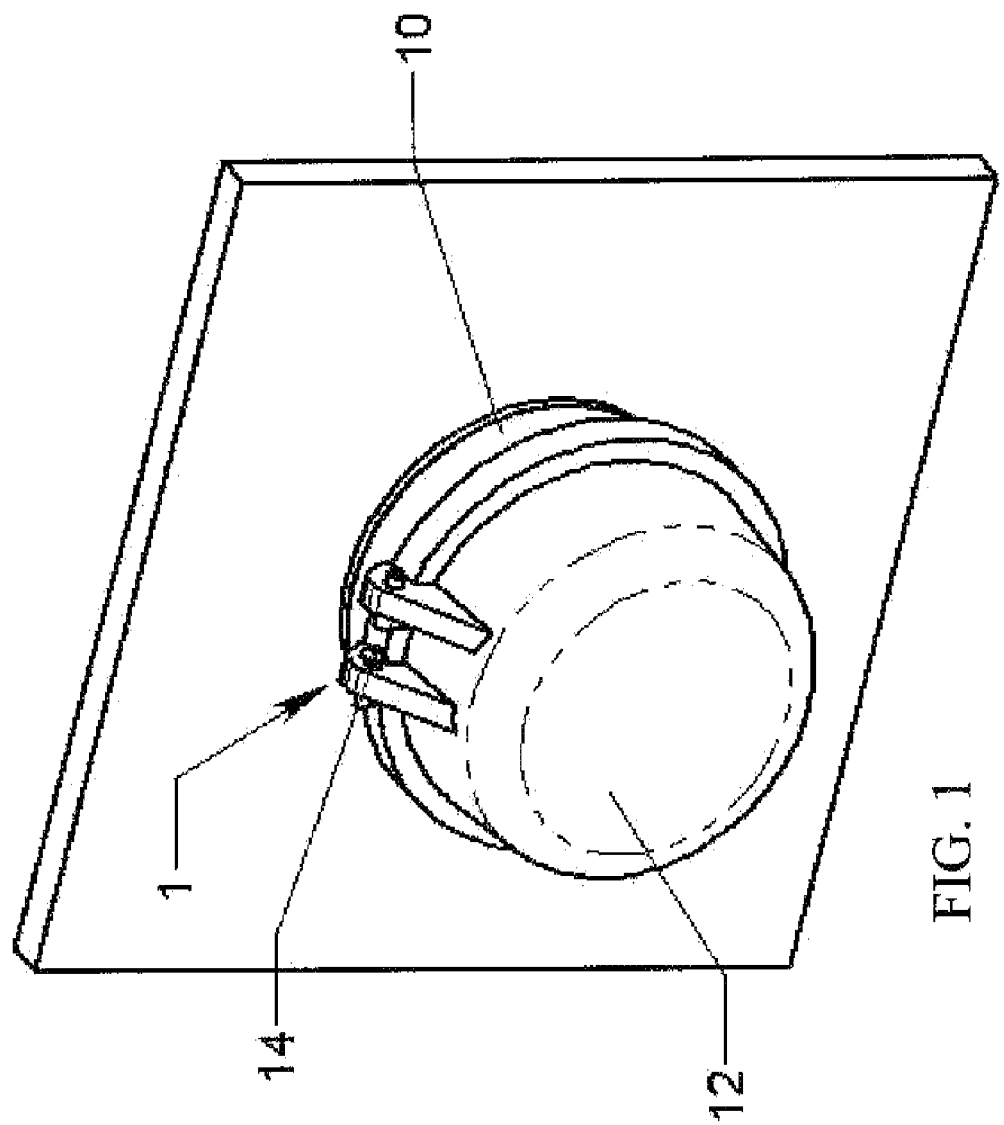
FIG. 1 is a front perspective view of a substantially circular while-in-use electrical device cover with the lid closed.
Figure 2:
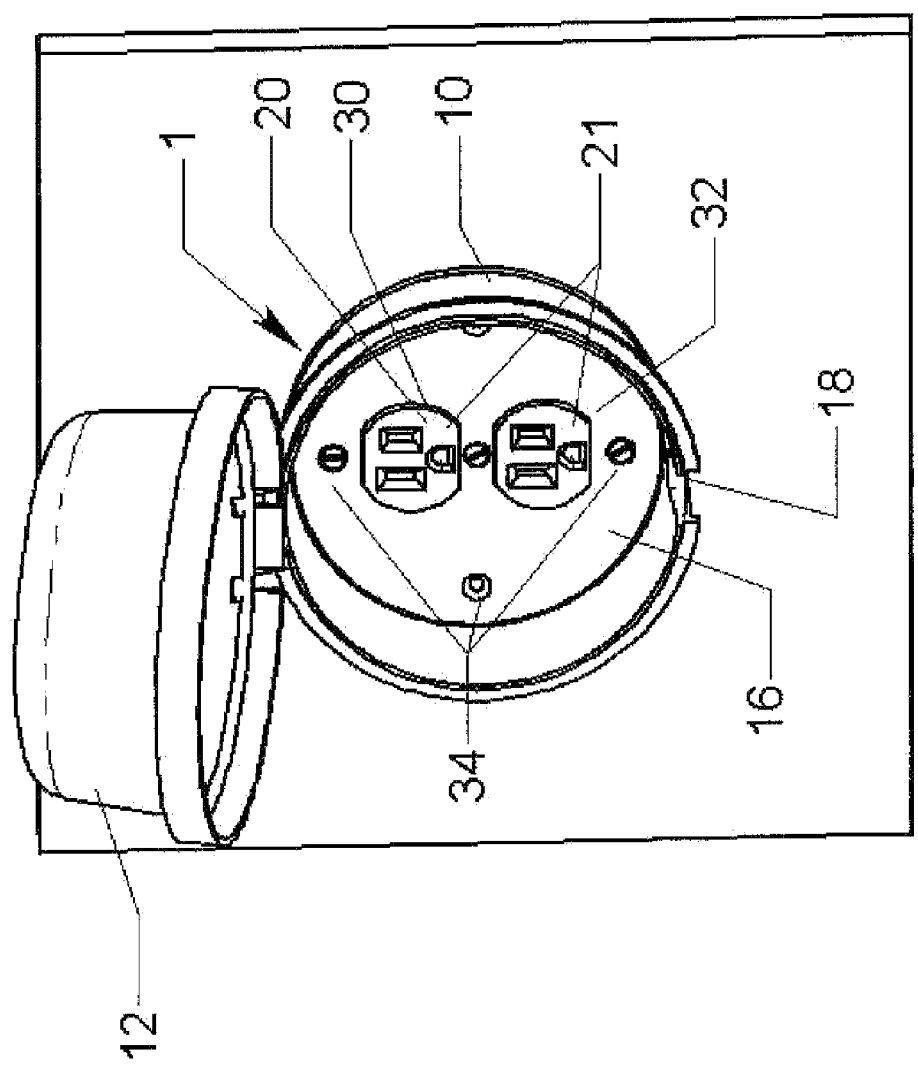
FIG. 2 is a front perspective view of a substantially circular while-in-use electrical device cover with the lid open.

Referring to FIG. 1, a particular implementation of a while-in-use electrical device cover 1 (hereafter "cover") is illustrated. The cover 1 shown in FIG. 1 includes a base 10 and a lid 12 that are substantially elliptical in shape, in this particular implementation circular in shape, with the lid 12 closed over the base 10. The base 10 and lid 12 may be coupled by a pin and barrel hinge 14 positioned so that gravity force can shut the lid 12 over the base 10 when the cover 1 is mounted to a wall. Referring to FIG. 2, a particular implementation of a cover 1 is illustrated with the cover 12 raised to show the interior of the base 10. The cover 1 is mounted over an electrical device 20, in this case a single receptacle, though any number and type of electrical devices 20 could be used with particular implementations of the cover 1. The base 10 may further include an adapter 16 that includes a plurality of box mounting screw apertures 34 to allow the cover 1 to be mounted when the electrical device 20 is mounted either vertically or horizontally. Other particular implementations may have the box mounting screw apertures 34 in the base 10 itself. The electrical device 20 is mounted vertically when its longest dimension points substantially perpendicularly from the surface of the ground or floor adjacent to the wall on which the cover is mounted. When the electrical device's 20 longest dimension is substantially parallel with the ground or floor adjacent to the wall on which it is mounted, the electrical device is mounted horizontally.

The electrical device 20 has a face 21 which may extend through apertures 30, 32 in the adapter 16. In other implementations without an adapter 16, the face 21 of the electrical device 20 may extend through corresponding apertures in the base 10. In FIG. 2, a cord port 18 is illustrated as an opening in the base 10. While the cord port 18 shown in FIG. 2 is a fully open aperture in the base 10 only, particular implementations of a cover 1 may have a cord port 18 in any surface of the cover 1, including the lid 12, the base 10, or both the lid 12 and the base 10. In addition, in other implementations the aperture in the cord port 18 may be open, or closed by a barrier intended to limit the ingress of water or other contaminants into the cover through the cord port 18 or may be closed by a removable tab in the base 10, the lid 12, or both the base 10 and the lid 12. Removal of the removable tab by the user opens the aperture in the cord port 18 and allows the user to close the cover 1 when an electrical device connector is inserted. Particular implementations may include a plurality of cord ports 18.

Figure 3:
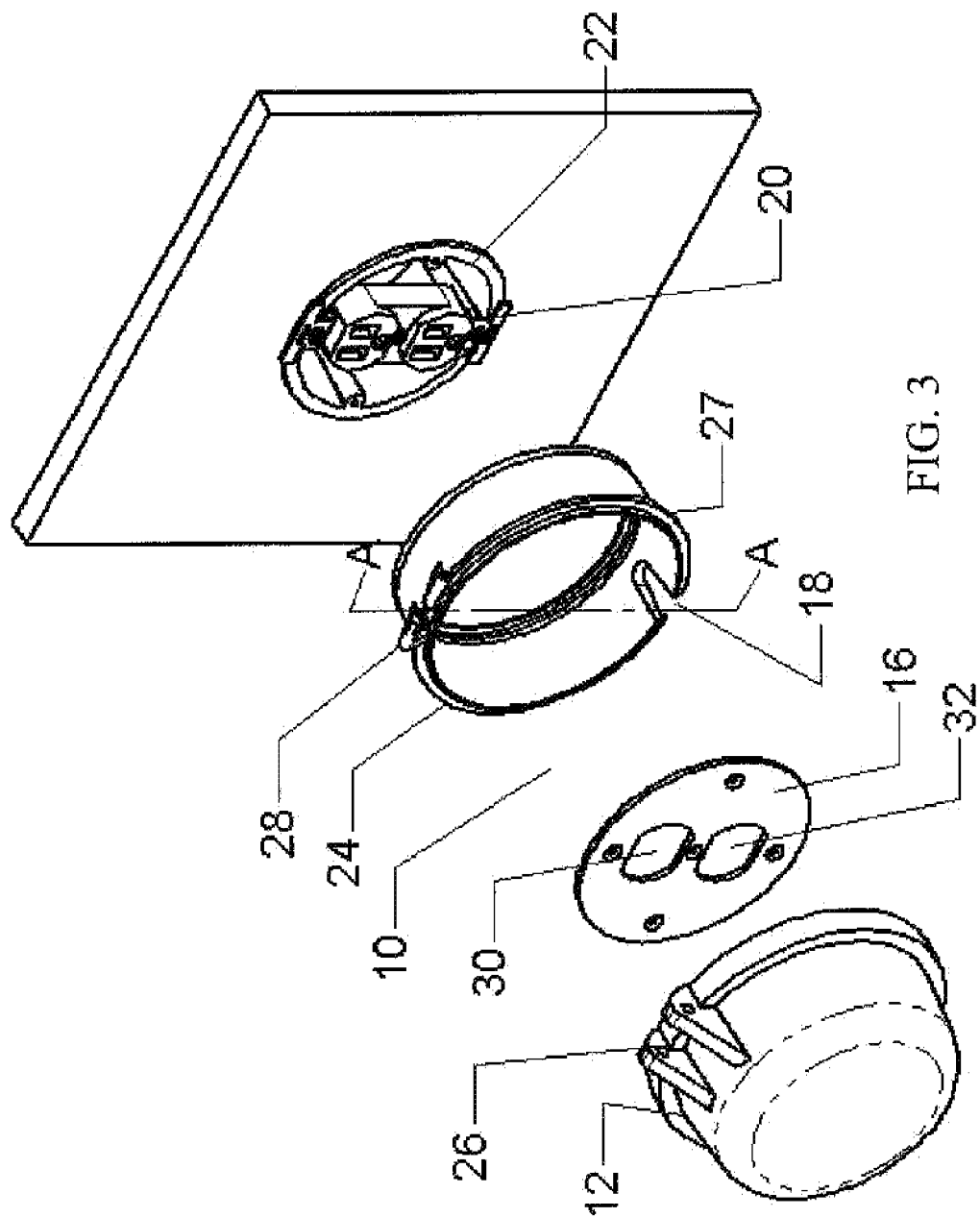
FIG. 3 is a broken apart view of a substantially circular while-in-use electrical device cover.

Referring to FIG. 3, an exploded view of a particular implementation of a cover 1 is illustrated. The base 10 includes a ring 24 and an adapter 16 with apertures 30, 32 configured to accommodate the face of an electrical device 20 mounted in an electrical box 22. A base hinge member 28 is located on the top surface 27 of the base 10 on the ring 24. The top surface 27 of the base 10 is the surface of the side or sides of the base 10 that faces the lid 12 when the lid 12 is closed over the base 10. A lid hinge member 26 is provided along the edge of the lid 12. In the particular implementation illustrated in FIG. 3, the lid hinge member 26 and the base hinge member 28 form a pin and barrel hinge. A cord port 18 is provided in the ring 24.

Figure 4:
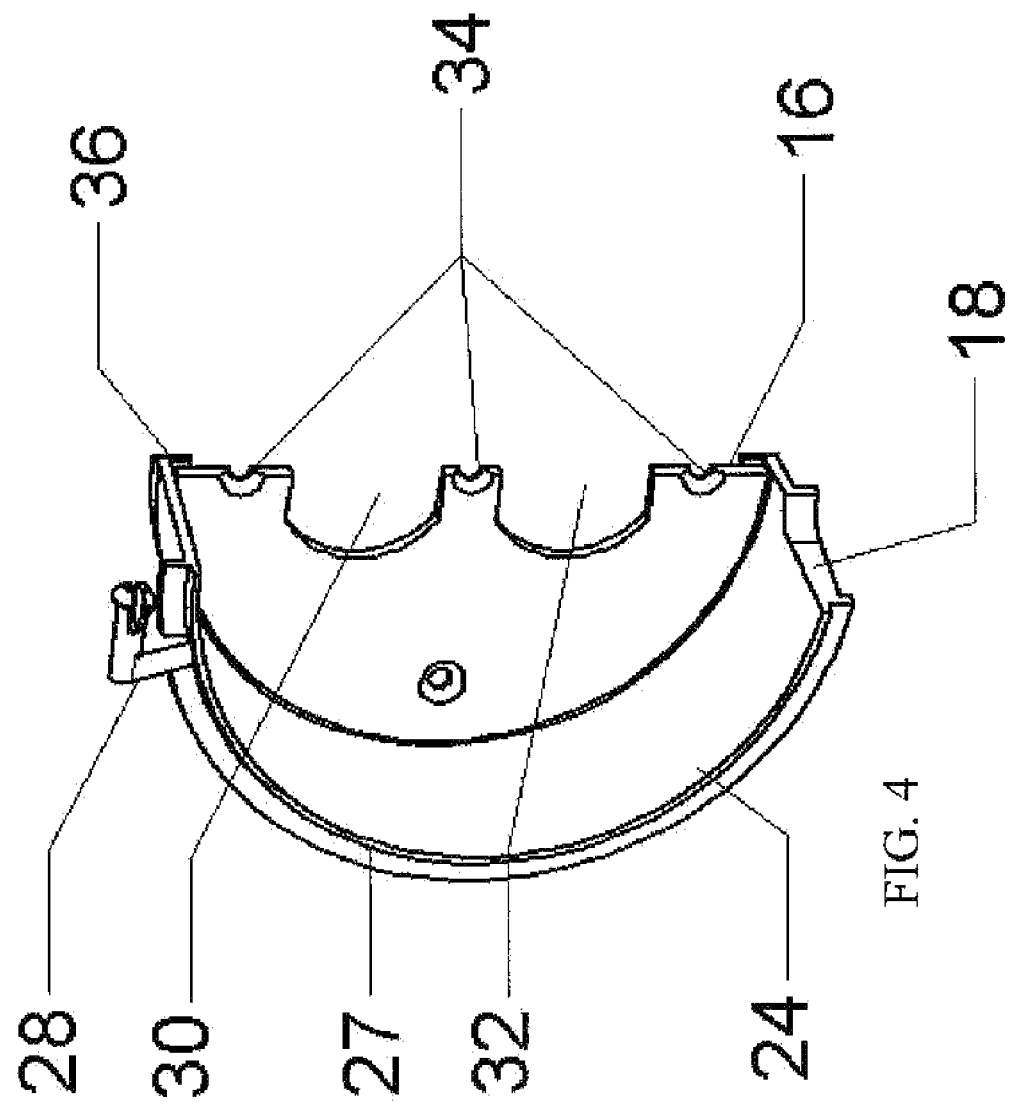
FIG. 4 is a cross-section view of a substantially circular while-in-use electrical device cover taken along sectional line A in FIG. 3.

Referring to FIG. 4, a cross-section view of the cover 1 along the section line A in FIG. 3 is illustrated. Here, the base 10 is shown with a lip 36 extending inward from the edge of the ring 24 that serves to engage with the adapter 16 and holds the ring 24 against the wall when the adapter 16 is mounted to the electrical box 22 through the box mounting screw apertures 34. Cross-section views of the cord port 18, the box mounting screw apertures 34, and the apertures 30, 32 are also visible along with the structure of the base hinge member 28 on the top edge 27 of the base 10.

Figure 5:
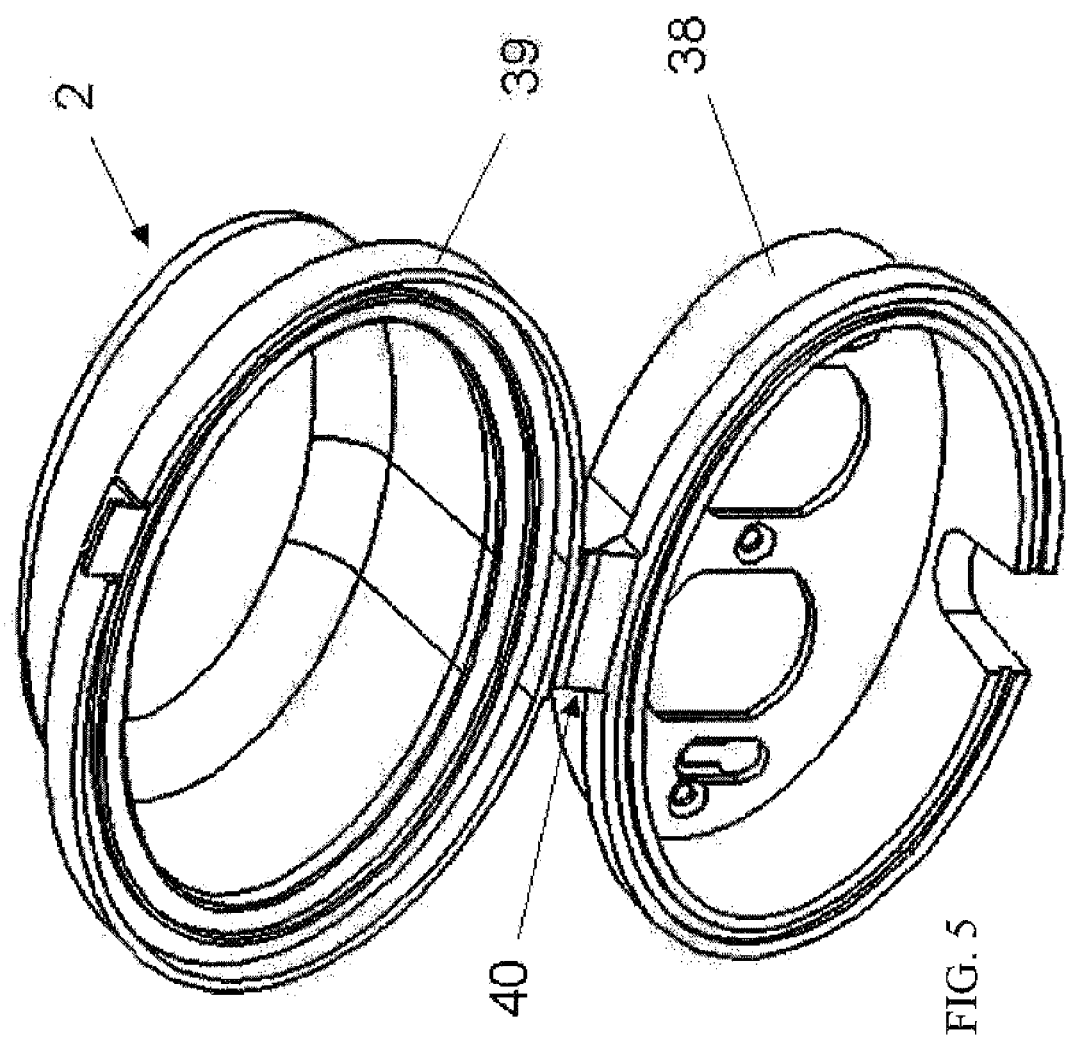
FIG. 5 is a front perspective view of a substantially elliptical while-in-use electrical device cover with a living hinge with the lid open.

Referring to FIG. 5, another particular implementation of a cover 2 is illustrated. The cover 2 shown in FIG. 5 includes a lid 39 and a base 38 that are substantially elliptical. The base 38 may include an adapter like the implementations shown in FIGS. 1-4, but configured to have an appropriate shape for this cover implementation. The hinge 40 shown attaching the lid 39 to the base 38 in FIG. 5 is a living hinge. Relevant teachings regarding the structure of living hinges and methods of forming and using living hinges are found in U.S. patent application Ser. No. 10/852,796 entitled "Horizontal and Vertical Mountable Electrical Outlet Box with Living Hinge" to Shotey et al. which was filed on May 24, 2004, the contents of which were previously incorporated by reference. Particular implementations of a cover 2 utilizing the living hinge 40 may consist of a lid 39, base 38 and living hinge 40 which are a single piece, namely, where the lid 39, base 38, and hinge 40 are formed as a integral unit through conventional manufacturing processes such as, by non-limiting example, injection molding, and the like.

Figure 6A:
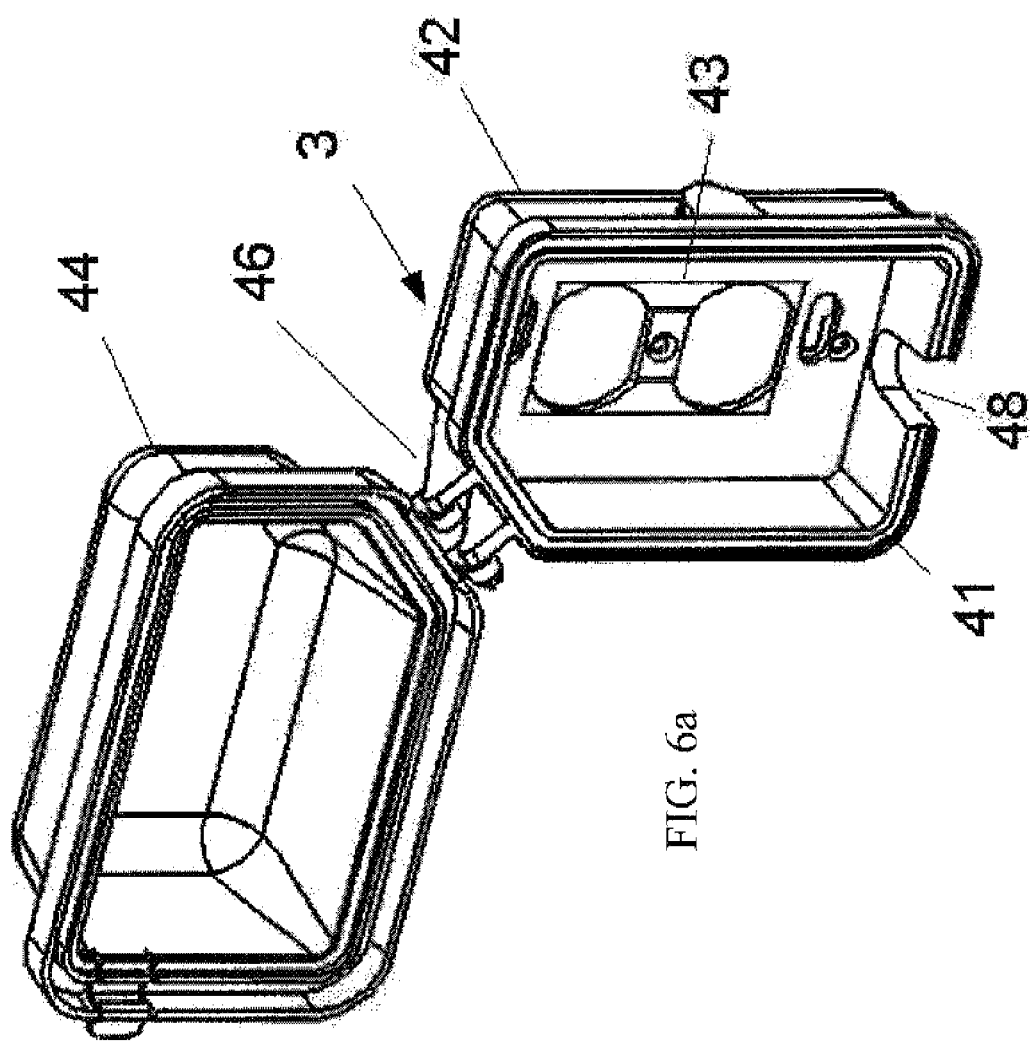
FIG. 6a is a front perspective view of a five-side while-in-use electrical device cover with the lid open.
Figure 6B:
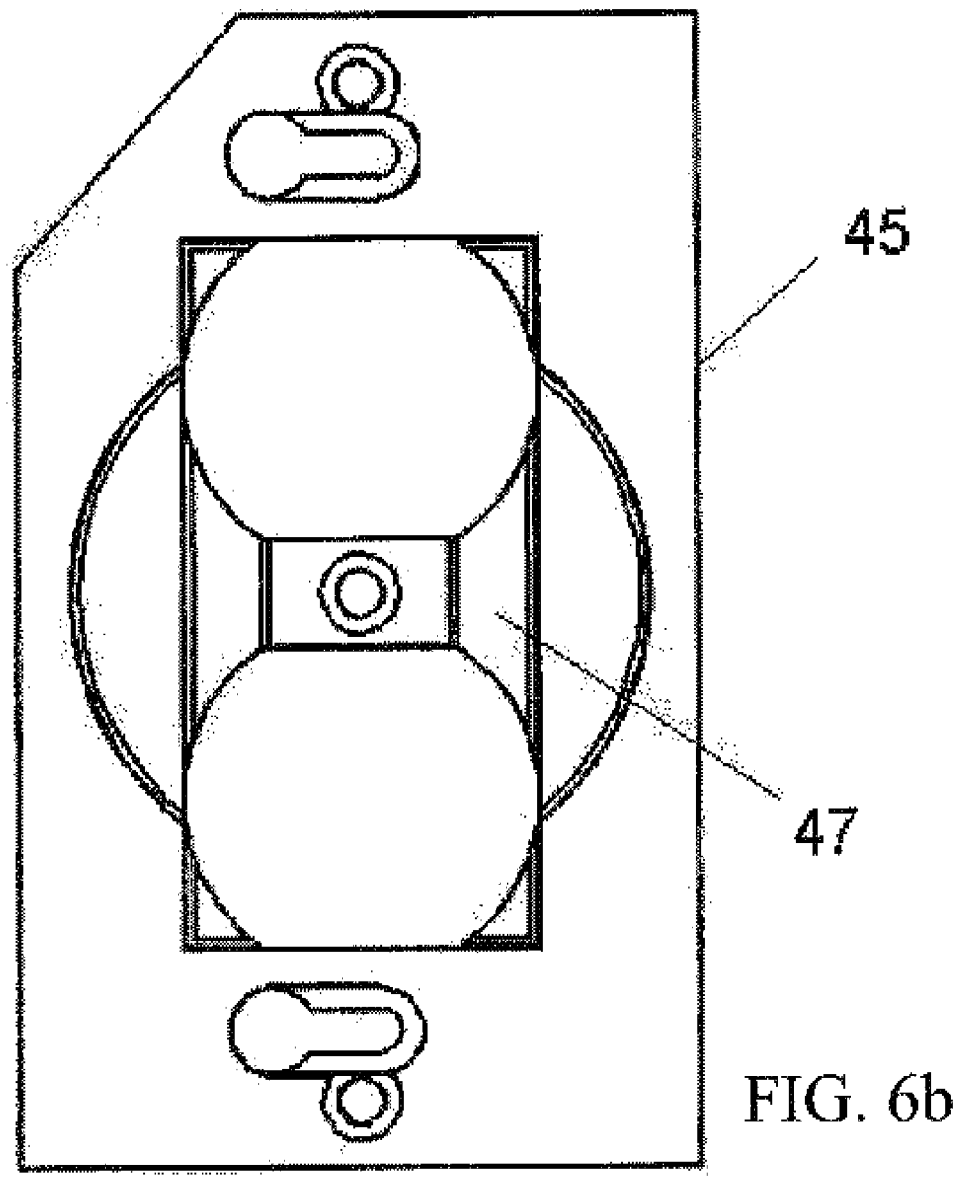
FIG. 6b is a front view of an adapter plate.

Referring to FIGS. 6a and 6b, another particular implementation of a cover 3 is illustrated. The cover 3 may include a base 42, a lid 44, a hinge 46, and a cord port 48. In the implementation illustrated, the lid 44 and the base 42 have five sides with the hinge 46 located along the top edge 41 of one of the sides of the base 42. As illustrated in FIG. 6a, since the hinge 46 is located on the top edge 41 of the side of the base 42 that is angled, the lid 44 may close over the base 42 under gravity force when the base 42 is mounted over an electrical device installed either horizontally or vertically. In the particular implementation illustrated in FIG. 6b, the base 42 of FIG. 6a may include an adapter 45. Both the base 42 and the adapter 45 may include removable tabs 43, 47 which permit the base 42 to be adapted to a different electrical device than the base 42 could previously accommodate. One of the features of the cover 3 is that because one of its corners has been replaced by a side, less material is required to manufacture the five sided cover 3 than a conventional four sided one. Using less material allows the five sided cover 3 to be produced more cheaply than a conventional four sided unit, even when the four sided unit has a corner hinge. In particular implementations, the adapter 45 may include four or more sides while the base 42 may include 5 or more sides.

Figure 7:
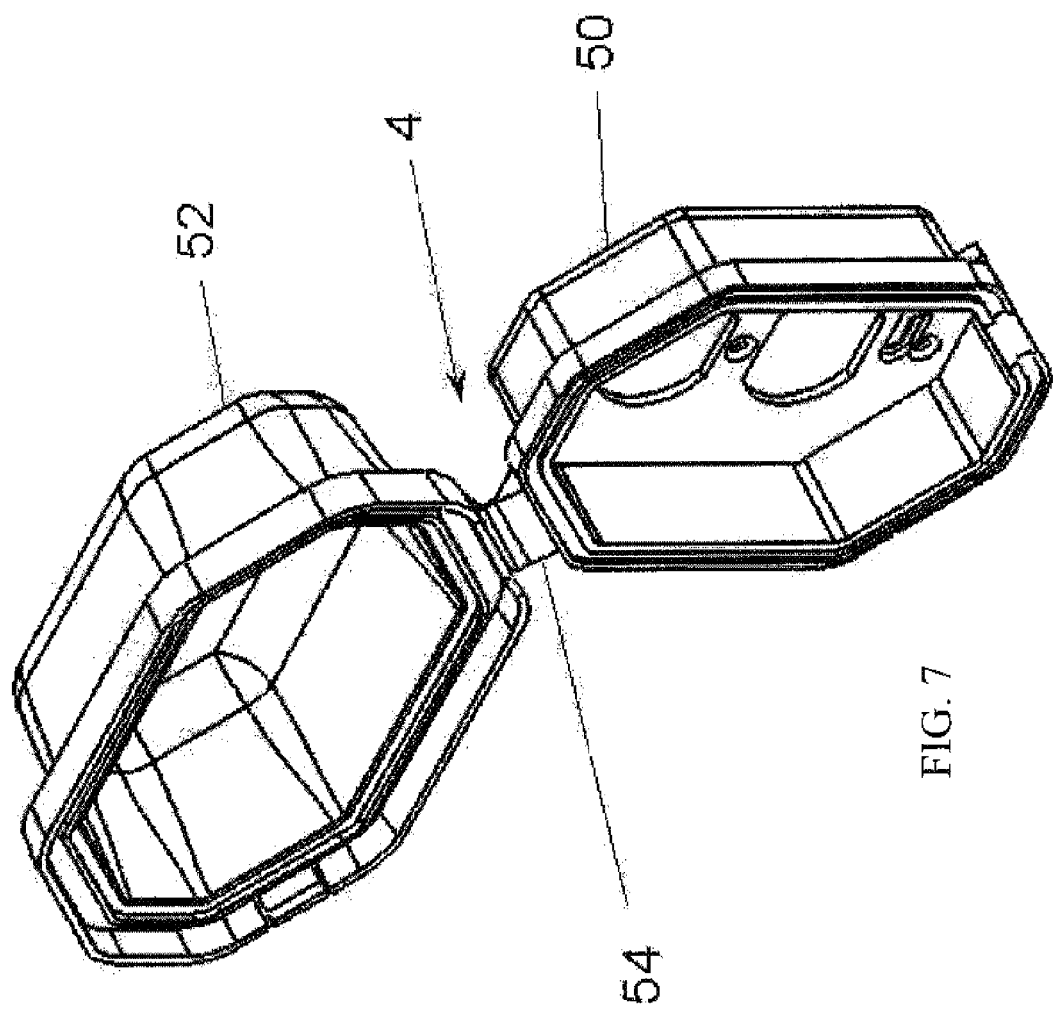
FIG. 7 is a front perspective view of an eight-sided while-in-use electrical device cover with a living hinge with the lid open.
Figure 8:
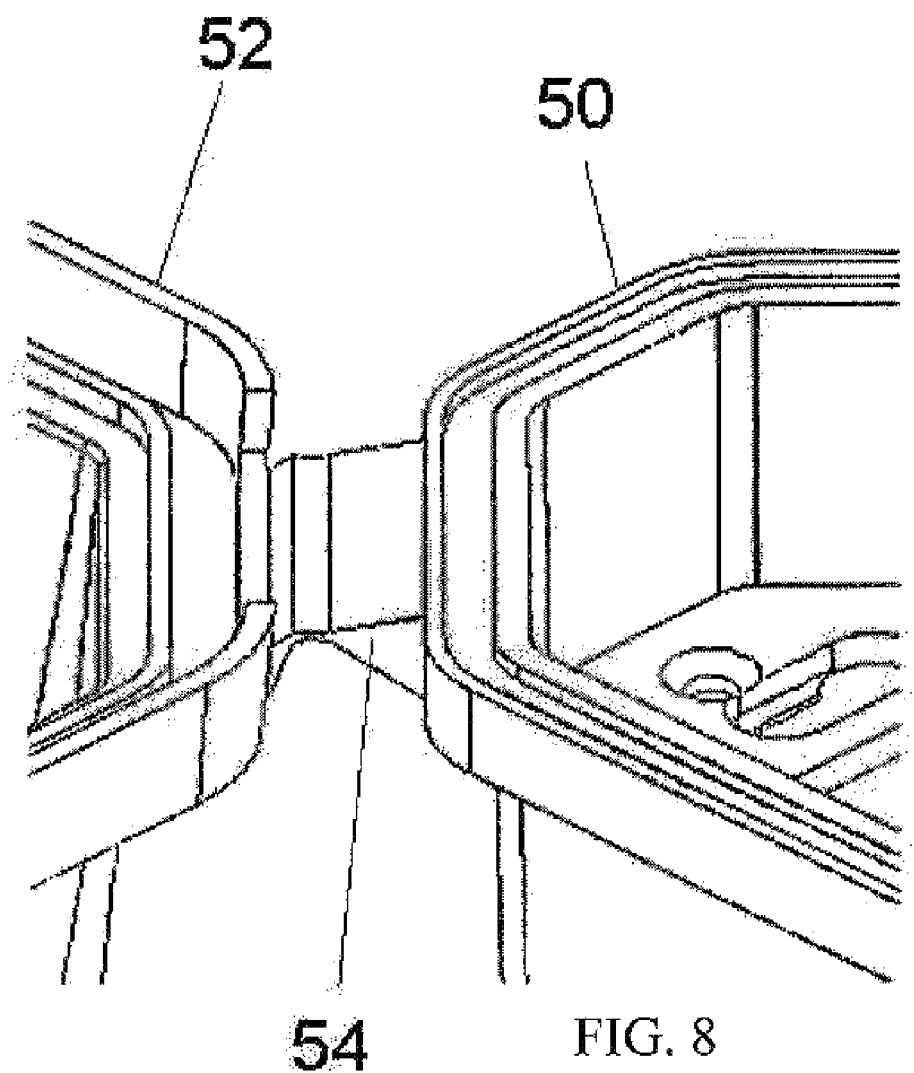
FIG. 8 is a detail view of the living hinge illustrated in FIG. 7.

Referring to FIG. 7, an eight sided cover 4 is illustrated. This cover includes a base 50 and a lid 52 coupled by a living hinge 54. As with the particular implementation of a five sided cover 3 illustrated in FIG. 6a, the eight sided cover 4 can be manufactured with less raw material than a conventional four sided cover and even less than the five sided cover 3 of FIG. 6a, further reducing cost of manufacture. FIG. 8 is a detail view of the structure of the living hinge 54. The living hinge 54 includes portions attached to the lid 52 and the base 50 joined by a thin strip. The living hinge 54 may be manufactured integrally with the lid 52 and the base 50, as part of either the lid 52 or the base 50, or as a separate piece. If the living hinge 52 is not manufactured integrally with the lid 52 and the base 50, various methods can be employed to couple it with the lid and the base including, by non-limiting example, heat welding, glue, clips, screws, and the like. Alternate hinge designs, for example, those hinge designs used in other implementations described herein, may be used in place of the living hinge of the various implementations shown.

Referring to FIGS. 3 and 4, a method of installing a particular implementation of the cover 1 includes the steps of first placing the ring 24 against the mounting wall around the electrical device 22. The adapter 16 may then be brought through the ring 24 against the lip 36 projecting inward from the ring 24. The adapter 16 can then be coupled with the electrical box 22 through the box mounting screw apertures 34, thus securing the ring 24 to the mounting wall simultaneously. Once the base 10 has thus been mounted to the electrical box 22, the lid 26 may be coupled with the base 10 through the lid and base hinge members 26, 28. While the particular implementation illustrated in FIGS. 3 and 4 shows the ring 24 being mounted first, followed by the adapter 16, other particular implementations may couple the adapter 16 to the electrical box 22 first and then couple the ring 24 to the electrical box through the adapter 16. Various methods may be used to couple the ring 24 to the adapter 16 to form the base 10 including, by non-limiting example, glue, Velcro®, clips, snaps, and the like.

It will be understood that implementations are not limited to the specific components disclosed herein, as virtually any components consistent with the intended operation of a method and/or system implementation for a while-in-use electrical device cover may be utilized. Accordingly, for example, although particular bases, lids, and adapters may be disclosed, such components may comprise any shape, size, style, type, model, version, class, grade, measurement, concentration, material, weight, quantity, and/or the like consistent with the intended operation of a method and/or system implementation for a while-in-use electrical device cover may be used.

In places where the description above refers to particular implementations of a while-in-use electrical device cover, it should be readily apparent that a number of modifications may be made without departing from the spirit thereof and that these implementations may be applied to other while-in-use electrical device covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A while-in-use electrical device cover comprising:
 a base comprising an aperture configured to receive the face of an electrical device; and
 a lid configured to close over the base through a hinge while an electrical connector is inserted into the electrical device; and
 a cord port extending through a surface of the cover;
 wherein a top edge of the base has at least five sides;
 wherein the base further comprises a base hinge member on a side of the top edge of the base;
 wherein the lid is configured to close over the base under gravity force when the base is mounted over the electrical device when the electrical device is oriented horizontally and vertically; and
 wherein the base further comprises an adapter configured to convert the aperture to receive the face of at least one other electrical device, the adapter comprising four or more sides and the base being mounted to an electrical box through the adapter.

2. The while-in-use electrical device cover of claim 1, wherein the hinge is a living hinge.

3. The while-in-use electrical device cover of claim 2, wherein the base, lid, and hinge are formed integrally as a single unit.

4. The while-in-use electrical device cover of claim 1, wherein the hinge is a pin and barrel hinge.

5. The while-in-use electrical device cover of claim 1, wherein the base further comprises at least one removable tab, wherein removal of the at least one removable tab enables the aperture to be converted to receive the face of at least one other electrical device.

6. The while-in-use electrical device cover of claim 1, wherein the adapter further comprises at least one removable tab, wherein removal of the at least one removable tab enables the aperture to be converted to receive the face of at least one other electrical device.

7. A while-in-use electrical device cover comprising: a base comprising an aperture configured to receive the face of an electrical device; and a lid configured to close over the base through a hinge while an electrical connector is inserted into the electrical device; and a cord port extending through a surface of the cover;
 wherein the lid has at least five sides; wherein the lid further comprises a lid hinge member on only one of the at least five sides of the lid;
 wherein the lid is configured to close over the base under gravity force when the base is mounted over the electrical device when the electrical device is oriented horizontally and vertically; and
 wherein the base further comprises an adapter configured to convert the aperture to receive the face of at least one other electrical device, the adapter further comprises four or more sides and the base is mounted to an electrical box through the adapter.

8. The while-in-use electrical device cover of claim 7, wherein the hinge is a living hinge.

9. The while-in-use electrical device cover of claim 8, wherein the base, lid, and hinge are formed integrally as a single unit.

10. The while-in-use electrical device cover of claim 7, wherein the hinge is a pin and barrel hinge.

11. The while-in-use electrical device cover of claim 7, wherein the base further comprises at least one removable tab, wherein removal of the at least one removable tab enables the aperture to be converted to receive the face of at least one other electrical device.

12. The while-in-use electrical device cover of claim 7, wherein the adapter further comprises at least one removable tab, wherein removal of the at least one removable tab enables the aperture to be converted to receive the face of at least one other electrical device.

* * * * *